United States Patent [19]

Allias

[11] Patent Number: 4,628,309
[45] Date of Patent: Dec. 9, 1986

[54] SYSTEM AND DEVICE FOR REMOTE SURVEILLANCE OF EQUIPMENT ON A DIGITAL TRANSMISSION LINK WITHOUT INTERRUPTING TRAFFIC

[75] Inventor: Bernard Allias, Bretigny sur Orge, France

[73] Assignee: Compagnie Industrielle des Telecommunications Cit-Alcatel, France

[21] Appl. No.: 558,672

[22] Filed: Dec. 6, 1983

[30] Foreign Application Priority Data

Dec. 6, 1982 [FR] France .................. 82 20406

[51] Int. Cl.⁴ .............. H04Q 9/00; H04B 17/02; G06F 11/00
[52] U.S. Cl. .................. 340/825.54; 455/9; 455/4; 375/10; 371/55; 340/825.16
[58] Field of Search .......... 340/825.54, 825.16; 371/55, 47, 57, 42, 2; 375/3, 4, 10, 113–116, 122; 455/9, 14, 601, 4

[56] References Cited

U.S. PATENT DOCUMENTS 3,987,395 10/1976 Desombre .
4,161,634 7/1979 Bellisio ............ 179/175.31 R
4,301,538 11/1981 Desombre et al. .......... 375/4
4,369,523 1/1983 Seki et al. .................. 375/3
4,473,901 9/1984 Jensen .................... 375/113

FOREIGN PATENT DOCUMENTS 0033932 8/1981 European Pat. Off. .
2653178 5/1978 Fed. Rep. of Germany .
2911298 8/1980 Fed. Rep. of Germany .
1401261 7/1975 United Kingdom .

Primary Examiner—Donald J. Yusko
Attorney, Agent, or Firm—Sughrue, Mion, Zinn, Macpeak, and Seas

[57] ABSTRACT

A remote surveillance utilizing signalling incorporated in traffic and concerns more particularly digital links using a prohibited configuration code for the line signal. The purpose is to produce a system consisting of periodically incorporating an interrogation identifier containing a prohibited configuration in the line signal at the transmitter terminal, recognizing the interrogation identifiers as they pass through equipment under remote surveillance, modifying one interrogation identifier out of r by equipment that has remote surveillance data to be transmitted, using the interrogation identifiers reaching the receiving terminal intact to determine those time slots occupied by the remote surveillance signal and extracting the identifiers occupying these time slots for decoding the remote surveillance.

5 Claims, 5 Drawing Figures

SYSTEM AND DEVICE FOR REMOTE SURVEILLANCE OF EQUIPMENT ON A DIGITAL TRANSMISSION LINK WITHOUT INTERRUPTING TRAFFIC

BACKGROUND OF THE INVENTION

This invention relates to the remote surveillance of equipment such as repeaters located along a digital transmission link. More specifically, it concerns remote surveillance utilizing signaling incorporated in the traffic on the basis of time division multiplexing with the data.

Remote surveillance systems of this type are already known in which signalling uses an identifier specific to each item of equipment followed by a reply block. These identifiers must be distinguishable from the data, this normally being obtained by making them of sufficient length for it to be highly improbable that a data burst would be identical. This method has the drawback that it does not totally eliminate a risk of confusion with data and requires long identifiers for remote surveillance which occupy the link disportionately.

SUMMARY OF THE INVENTION

The purpose of this invention is to overcome this drawback in the case of a digital transmission link by using a prohibited configuration code for the line signal.

Its purpose is to describe a remote surveillance system consisting of:

Introducing an interrogation identifier periodically containing a configuration that is prohibited by the code and sent from the link transmission terminal, Recognizing the interrogation identifiers as they come to each unit under remote surveillance, In an equipment unit having remote surveillance data to be transmitted, modifying one interrogation identifier out of r that are recognized, r being an integer greater than 1 and the modification made denoting the remote surveillance data, Using the interrogation identifiers coming to the link's terminal unchanged to synchronize a clock to the interrogation identifier rate which determines the periodic time slots occupied by changed interrogation identifiers or identifiers not carrying remote surveillance data in the line signal as it reaches the reception terminal, Separating the identifiers in the said time slots from the line signal arriving at the reception terminal, Decoding the identifiers occupying the said time slots to obtain remote surveillance data.

In the case of a digital link utilizing a block code to generate the line signal, it is advantageous for the interrogation identifier containing a configuration prohibited by the code to occupy a whole number of code blocks since this avoids the interrogation identifier interfering with the block by block decoding at the reception terminal.

Another purpose of the invention is also a system for utilizing the remote surveillance procedure described above.

Other characteristics and advantages of the invention become apparent from the attached claims and the description hereafter of a method of implementing the system in an optical fiber data transmission link with intermediate repeaters using a 5 B6 B type block code.

This description will be given with reference to the drawing in which:

DETAILED DESCRIPTION OF THE PREFERRED EMBODIMENT

In a data transmission link, data are transmitted in the form of a sequence of isochronous symbols. Recovering them on reception requires data about the symbol timing as well as the transmission quality. It is standard practice to transmit such information along with the data by using the symbols of a redundant code to generate the symbols, this enabling those configurations that are least favorable to recovery of the timing to be eliminated from the line signal and the quality of the link to be monitored by detecting errors resulting in prohibited configurations on reception.

In the case of a fiber optics link, a two-level line signal is preferably adopted because of nonlinearity and the temperature dependence of the characteristics of the optical source. This two-level line signal is in general generated using a multialphabet type nB mB code having a limiting numeric sum which converts blocks of n bits into blocks of m bits where m is greater than n, so that the difference between the number of labels and spaces transmitted has a mean value of zero. This type of code guarantees an adequate transition frequency in the line signal for recovering the bit rate and enables the link to be monitored by detecting overstepping of the current numeric sum K.

With an nB mB code having a limiting current numeric sum varying with an interval of width Q (positive integer), a configuration of more than Q identical successive bits is prohibited in the line signal and may be used as a interrogation identifier for a remote surveillance system for intermediate line equipment. This configuration should preferably have a number of bits equal to a multiple of m in order not to interfere with recovering word synchronization on decoding and should be interspaced between the code words at a fairly slow repetition frequency so as not to interfere with bit rate recovery circuits. It can advantageously contain one or more n-bit words containing a succession of Q+1 identical bits. Thus, as used herein and in the following claims, for a transmission system wherein data is encoded according to coding rules, a "forbidden" or "prohibited" configuration is a sequence of bits which cannot result from the application of those coding rules to the data.

The accompanying figures give details of a system of remote surveillance utilizing an interrogation identifier of this type within the context of an optical fiber digital transmission link using a 5 B 6 B code where the numeric sum is limited to ±3 and which is currently recognized as being a good compromise between the redundancy obtained, the complexity of implementation, the increase in the line bit rate and the extra width of the band width, for bit rates in the region of 140 mbit/s.

Figure 1:
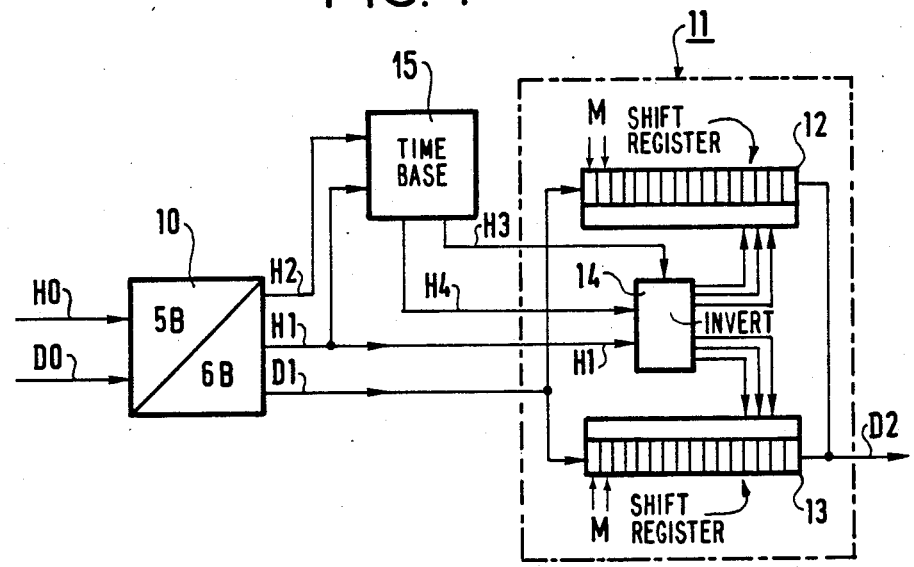
FIG. 1 represents the part of a line terminal involved in the periodic generation of a remote surveillance interrogation identifier.

The interrogation identifier may be inserted at various levels when the signal is processed electrically in the link transmission terminal. In particular, and as a nonrestrictive example, it can be performed as represented in FIG. 1, after the 5 B 6 B coding. This figure shows a 5 B 6 B coder followed by a circuit that periodically inserts interrogation identifiers.

The coder (item 10) is not shown in detail because it is of a known type. It receives the data to be transmitted as a continuous sequence of isochronous bits $D_o$ at bit rate $f_o$ timed by a clock signal $h_o$. It outputs another sequence of isochronous bits $D_1$ at a higher bit rate in the ratio 6/5, a clock signal bit $H_1$ at the frequency of $(6/5)f_o$ and a clock signal word $H_2$ at the frequency $(1/5)f_o$ marking the boundaries of the 6 bit blocks formed by the words belonging to the code's alphabets.

As a nonlimiting example, the interrogation identifier is the following configuration of 12 bits:

100000000001 which consists of two consecutive six-bit words with five successive blanks not permitted in the 5 B 6 B code alphabets.

The periodic insertion circuit indicated by 11, using time division multiplexing, inserts this interrogation identifier after p successive code words coming from coder 10 and generates signal $D_2$ used to excite an optical modulator supplying the line signal. It may be produced, as represented, using two shift register 12, 13 connected in parallel at the output of coder 10 and operating alternately in read and write modes during equal time slots but with different shift rates. The two shift registers 12, 13 have p+2 times six stages, one three-state serial output and a serial input, as well as parallel inputs to their first 12 stages. Their serial input is connected to the output of coder 10 whereas their parallel inputs are set to logical levels corresponding to the levels of the bits forming the interrogation identifier M. Their serial outputs are in parallel, one of them being in a low impedance state at any one time. Switching of read and write functions between shift registers 12, 13 is controlled by a multiple inverter 14 switched to the clock signal timing $H_3$ at rate $(1/p) H_2$. In the first state, this inverter 14 puts one of the switch registers into the "write" state by keeping its serial output in the high impedance state and applying the clock signal $H_1$ as the shift rate, and the other shift register in the "read" state by putting its serial output to the low impedance state and applying a clock signal $H_4$ at frequency $[(p+2)/p] H_1$ as the shift rate. In the second state, inverter 14 exchanges the roles of the shift registers. During switchover, it controls activation of the parallel inputs of the shift register which was in "read", causing the interrogation identifier M to be written to the first stages of the latter. The clock signals $H_3$, $H_4$ are obtained in a time base 15 by division from a oscillator synchronized with the clock signal bit and word $H_1$, $H_2$ generated by coder 10.

It is also possible to insert the interrogation identifier in two stages by initially using the time division multiplexing which is generally performed before 5 B 6 B coding to add digital service channels to the data traffic, in order to place time slots in the signal to be coded that can contain the interrogation identifier and by completing the coder's alphabets so that it can write the interrogation identifier in these time slots.

Figure 2:
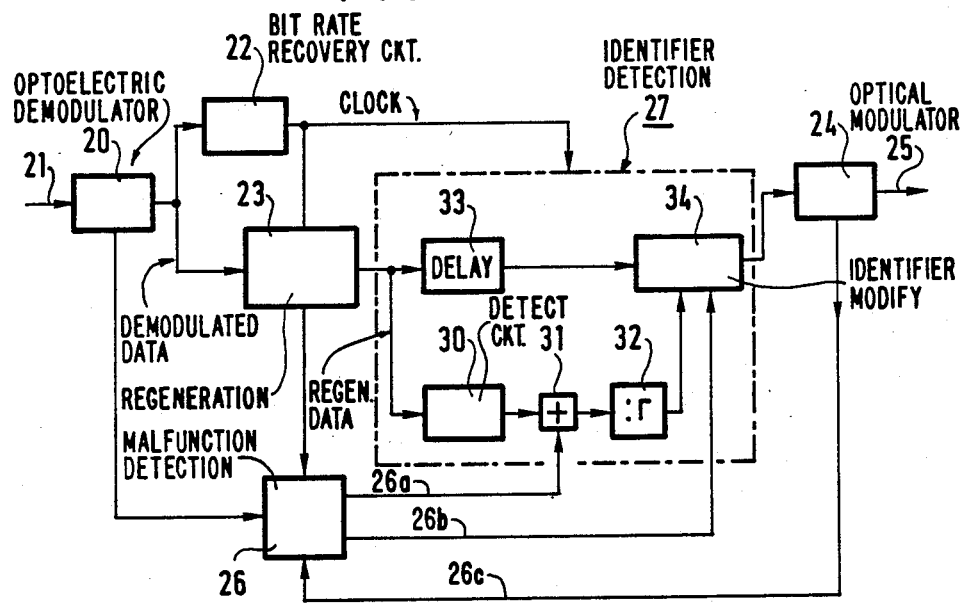
FIG. 2 represents an intermediate repeater under remote surveillance with circuits for processing the interrogation identifier, FIG. 3 gives a detailed plan of the circuit for changing the interrogation identifier equipping the repeater in FIG. 2.

FIG. 2 is the schematic representation of an optical link repeater equipped to detect an interrogation identifier and to modify it if necessary to transmit remote surveillance data.

This repeater conventionally comprises an optoelectrical demodulator 20 connected at the input to an optical fiber 21 which connects it to the output of the transmission terminal or another repeater, electronic signal formatting circuits consisting basically of a bit rate recovery circuit 22 and a regeneration circuit 23, an optical modulator 24 which receives the regenerated signal, the optical output of which is connected to an optical fiber 25 connecting it to the reception terminal or to another repeater, and an operating malfunction detection circuit 26 which provides a binary signal on line 26a indicating that an alarm is present and a digital signal on line 26b identifying the alarms.

A circuit 27 that detects and changes the interrogation identifiers is inserted between the output of the regeneration circuit 23 and the input to optical modulator 24. Like the regeneration circuit 23, it is time driven by the bit clock recovery circuit 22, and it is controlled by the operating malfunction detection circuit 26 while the modulator 24 is monitored by the circuit 27 via line 26c. It consists basically of an interrogation identifier detection circuit 30 connected directly to the output of the regeneration circuit 23, a logical AND gate 31 which will inhibit the interrogation identifier detection circuit 30 or not, depending on the state of the alarm present signal supplied by the operating malfunction detection circuit 26, a factor r divider 32 connected following the logical AND gate 31, a delay circuit 33 connected to the output of the regeneration circuit 23 and an interrogation identifier modification circuit 34 connected after the delay circuit 33 and triggered by the output of the factor r divider monitored by the alarm identification digital signal generated by the operating malfunction detection circuit 26.

The string consisting of the interrogation identifier detection circuit 30, the logical AND gate 31 and the divider 32 enables the modification procedure for a interrogation identifier only to be actuated in the presence of an alarm and after r successive identifications of interrogation identifiers. This is because it is important not to modify all interrogation identifiers in order that all repeaters on the link can receive intact interrogation identifiers whatever the alarm states of the repeaters located before them on the link. In addition, the interrogation identifiers must arrive at a sufficiently high rate at the receiver terminal for it to determine unambiguously which time delay slots are reserved in the line signal to remote surveillance system data.

Delay circuit 33 is used to compensate for the delay caused by detecting an interrogation identifier.

Figure 3:
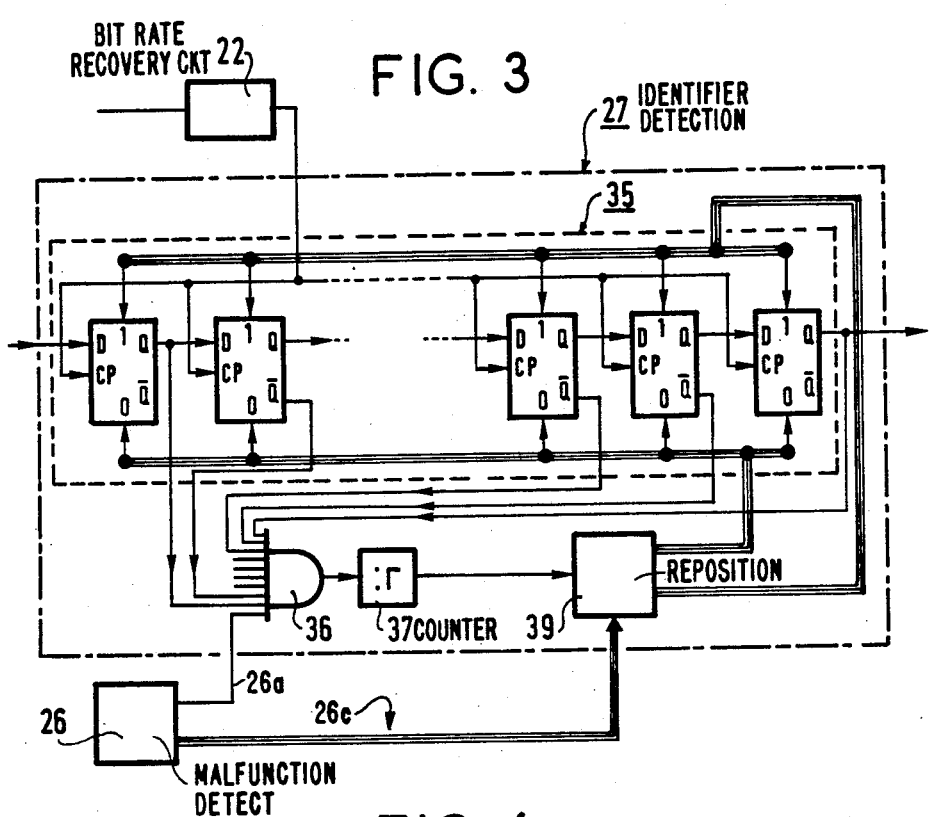

FIG. 3 illustrates a practical example of an interrogation identifier detection and modification circuit 27 as in FIG. 2. This circuit consists essentially of a shift register 35, made up of a string of 12 type D flip-flops timed by the clock bit recovery circuit 22, a logical AND gate 36 with 13 inputs: 12 inputs connected to the outputs Q or Q from the first to the twelfth stage of shift register 35 depending on the configuration of the 12 bits of the interrogation identifier and an input receiving the alarm present signal coming from the operating malfunction detection circuit 26, a factor r counter 37, (r being an integer greater than 1), and a repositioning circuit 39 for the type D latches of shift register 35 triggered by the output signal from counter 37 and monitored by the alarm identification digital signal generated by the operating malfunction detection circuit 26.

Interrogation identifiers are detected by their being coincident between the outputs from the twelve stages of shift register 35 detected via the logical AND gate 36.

The repositioning circuit 39 actuates the zero and one reset inputs from the first to the twelfth type D latches of shift register 35 in order to replace the interrogation identifier by an alarm message containing, where appropriate, a repeater identification number. This may be brought about using a set of branch gates which, controlled by the alarm identification digital signal, switch the output from counter 37 to one of the zero or one reset inputs of the type D latches.

Figure 4:
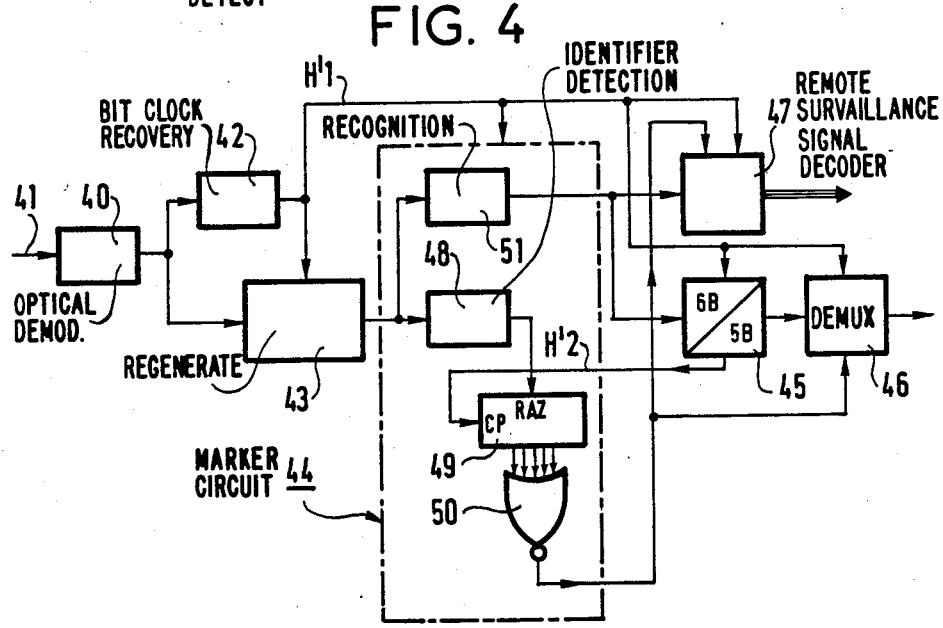
FIG. 4 illustrates the part of a line terminal involved in receiving interrogation identifiers and decoding changes made in them by the repeaters.

The line reception terminal shown in FIG. 4 has, at its input, the same components as an intermediate repeater. An optical demodulator 40 is connected at the input to an optical fiber 41 which provides the link with the output from the last intermediate repeater. Its output signal is applied to electronic reformatting circuits consisting basically of a bit clock recovery circuit 42 and the regeneration circuit 43 timed by the bit clock recovery circuit.

On output from the regeneration circuit 43, the signal travels through a recognition circuit 51 during the time slots occupied by the remote surveillance signals where it is delayed to compensate for the time taken to recover these time slots. It is then applied first to a 5B 6 B decoder indicated by 45, and a demultiplexing circuit 46 which supplies the decoded traffic signal no longer containing the remote surveillance signals and second to a remote surveillance signal decoder 47.

The 5 B6 B decoder is timed by the bit clock recovery circuit 42. It supplies the decoded traffic signal mixed with incorrect identifiers occupying the time slots reserved for remote surveillance signals as well as a clock signal word H'$_2$ which denotes the split up into 6 bit groups of the output signal from the regeneration circuit that it has adopted for decoding. This clock signal H'$_2$ is obtained in a well known manner by dividing the bit clock signal H'$_1$ produced by the clock recovery circuit 42 by a factor of 6, this division by 6 being periodically replaced by division by 5 or 7 when the bit rate of the non-recognized code words exceeds a certain threshold.

The marker circuit 44 for the time slots used by the remote surveillance signals receives a number of interrogation identifiers M from the remote surveillance system which arrive intact at the receiver terminal since each intermediate repeater changes no more than one out of r that are recognized and uses them to locate the position of the time slots assigned to remote surveillance. In order to do this, it has an interrogation identifier detection circuit 48 which controls the RESET of a times p+2 counter 49 and timed by the clock signal word H'$_2$ supplied by the 5 B6 B decoder. The first two states of counter 49 which coincide with each time slot are detected by means of a logical NOR gate 50 the multiple inputs of which are connected to the outputs of the stages of counter 49, with the exclusion of the first.

The consultation identified detection circuit 48 may be made up, as in the case of an intermediate repeater; using a shift register having a serial input along with parallel outputs connected at the output of the regeneration circuit 43 and timed by the bit clock recovery circuit 42, a logic system providing systematic comparison of output states from the 12 register stages with the configuration of the interrogation identifier and a resynchronization circuit located at the output of the logic system, producing a RESET pulse for counter 49 at the start of the bit which appears every time an interrogation identifier is detected. Delay circuit 51, located between regeneration circuit 43 and the 5 B 6 B decoder, then delays the clock signal word H'$_2$ by an interval of two time slots.

The signal labelling the time slots occupied by the remote surveillance signal produced by the marker circuit 44 is used to inhibit the remote surveillance signal decoder 47 which is inhibited outside these time slots and for timing the time division demultiplier 46 which eliminates from the 5 B6 B decoder signal those slots corresponding to these time slots and provides the traffic signal in the isochronous form which it had before being processed by the 5 B6 B coder in the transmission terminal.

The remote surveillance signal decoder 47 can be produced using a ROM addressed by 12 bit words using a twelve stage shift register loaded serially at the rate of the recovered bit clock signal H'$_1$ during each of the time slots determined by the labeling circuit 44.

Demultiplexer 46 can be produced using an independent read/write memory in which the write address counter is held at zero during the time slots determined by the recognition circuit 44 and timed by the recovered bit clock signal H'$_1$, in which the read address counter is zero reset after each time slot, determined by the recognition circuit 44 and timed by a clock signal having a frequency equal to 5/6 of that of the recovered bit clock H'$_1$.

Figure 5:
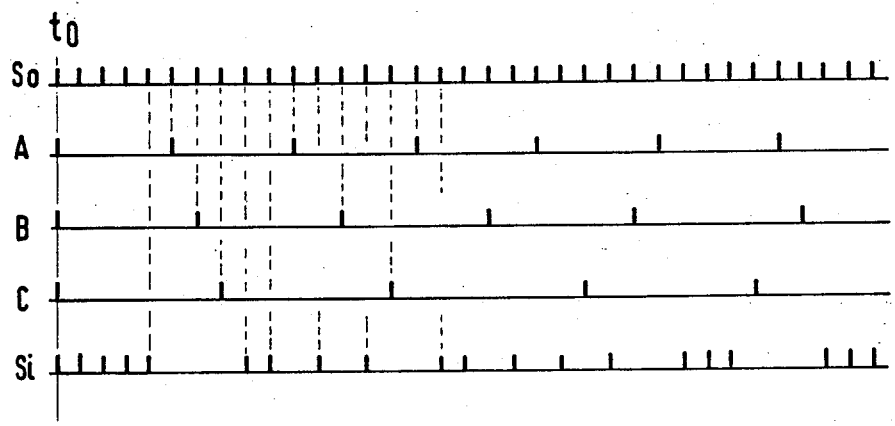
FIG. 5 is a diagram of curves plotted as a function of time illustrating the remote surveillance operation.

FIG. 5 illustrates an example of the operation of a remote surveillance system equipping a remote surveillance link having repeaters that can only modify an interrogation identifier after 5 successive recognitions (r=5), three of them A, B, C located at increasing distances from the transmission terminal in an alarm status.

Curve S$_o$ consisting of a sequence of pulses shows the times at which the transmit terminal sends the interrogation identifiers as a function of time.

Curves A, B, and C shows those interrogation identifiers which are changed by repeaters A, B or C respectively from among the sequence generated by the transmission terminal.

Curve S$_i$ shows interrogation identifiers from among the sequence generated by the transmission terminal which arrive intact at the receiver terminal and are used to determine which time slots are occupied by remote surveillance signals.

When choosing the interrogation identifier, it is advantageous to supplement the prohibited configuration which is characteristic of the identifier by bits, as has been seen previously, in order to give the identifier a link that is a multiple of a coding block and to enable it to be recognized without knowing the limits of the coding blocks.

Repeaters on the same link can be assigned different successive recognition numbers in the interrogation identifier. For instance, since an interrogation identifier has a greater chance of arriving intact at a repeater which is closer to the transmission terminal, a larger number can be adopted for r for those repeaters which are close to the transmission terminal than for those which are close to the receiver terminal. It is also acceptable that a repeater which has transmitted an alarm can, after a certain time, be allowed a lower repetition frequency, with the number of successive repetitions (r) going to a high value a certain time after the alarm has occurred.

What is claimed is:

1. A system for remote surveillance of equipment on a digital transmission link connecting a transmitter terminal to a receiver terminal without interrupting traffic, said link transmitting an on-line signal using a redundant code having at least one prohibited configuration, said system comprising:

first means at the transmitter terminal for periodically introducing into the on-line signal an interrogation identifier containing said prohibited configuration;

second means for recognizing interrogation identifiers as they pass through each equipment unit;

third means for changing one interrogation identifier out of r recognized interrogation identifiers to encode remote surveillance data in equipment having remote surveillance data to be transmitted, r being an integer greater than one;

fourth means at said receiver terminal for receiving unchanged interrogation identifiers and responsive to said unchanged interrogation identifiers for determining periodic time slots occupied in said on-line signal by interrogation identifiers changed or unchanged;

fifth means responsive to said fourth for separating said interrogation identifiers from said on-line signal at said receiver terminal; and sixth means for decoding said interrogation identifiers to provide said remote surveillance data.

2. A system as defined in claim 1, wherein said digital transmission link utilizes block codes having code blocks and wherein each said interrogation identifier occupies a whole number of code blocks.

3. A system as defined in claim 1, wherein said third means includes counting means for counting the number of interrogation identifiers recognized in said second means, and wherein said fourth means includes means for detecting unchanged interrogation identifiers, clock means for adjusting to the repetition frequency of the interrogation identifiers and synchronized in accordance with the detected unchanged interrogation identifiers, and means responsive to said clock means for producing a timing signal corresponding to the time slots occupied by both changed and unchanged interrogation identifiers.

4. A system as defined in claim 1, wherein said digital link uses binary signaling and wherein said means for detecting unchanged interrogation indetifiers comprises a shift register (35) and a logic system (36) for detecting when the contents of said shift register coincide with the configuration of said unchanged interrogation identifier.

5. A system as defined in claim 1, wherein said third means consists of a repositioning circuit (39) for changing the contents of appropriate stages of said shift register.

* * * * *